(12) United States Patent
Harknett et al.

(10) Patent No.: US 11,041,434 B2
(45) Date of Patent: Jun. 22, 2021

(54) ADAPTIVE PROTECTION FOR A MULTI-FUEL GENERATOR SYSTEM

(71) Applicant: CLARK EQUIPMENT COMPANY, Statesville, NC (US)

(72) Inventors: Nicholas Harknett, Statesville, NC (US); Chinmay Bhatt, Statesville, NC (US)

(73) Assignee: CLARK EQUIPMENT COMPANY, Statesville, NC (US)

(*) Notice: Subject to any disclaimer, the term of this patent is extended or adjusted under 35 U.S.C. 154(b) by 11 days.

(21) Appl. No.: 15/965,395

(22) Filed: Apr. 27, 2018

(65) Prior Publication Data

US 2019/0331023 A1    Oct. 31, 2019

(51) Int. Cl.

| F02B 63/04 | (2006.01) |
| F02B 43/12 | (2006.01) |
| F02D 19/06 | (2006.01) |
| F02D 29/06 | (2006.01) |

(52) U.S. Cl.
CPC ............ *F02B 63/048* (2013.01); *F02B 43/12* (2013.01); *F02D 19/0615* (2013.01); *F02D 19/0647* (2013.01); *F02D 19/0668* (2013.01); *F02D 29/06* (2013.01)

(58) Field of Classification Search
CPC .. F02D 19/0668; F02D 29/06; F02D 19/0615; F02D 19/0647; F02D 2250/26; F02D 41/021; F02D 19/0613; F02D 41/0025; F02B 43/12; F02B 63/048; Y02T 10/30

USPC ....................................... 60/39.24; 290/40 C
See application file for complete search history.

(56) References Cited

U.S. PATENT DOCUMENTS

| 6,250,260 B1 | 6/2001 | Green |
| 2012/0210988 A1 | 8/2012 | Willi |
| 2014/0182560 A1 | 7/2014 | Veit et al. |
| 2017/0037796 A1 | 2/2017 | Collie et al. |
| 2018/0073467 A1* | 3/2018 | King ..................... F02D 19/061 |
| 2018/0080392 A1 | 3/2018 | Janscha |

FOREIGN PATENT DOCUMENTS

WO    2016/133563 A1    8/2016

OTHER PUBLICATIONS

International Written Opinion of the International Searching Authority dated Jun. 26, 2019 for corresponding International Application No. PCT/US2019/024125 (10 pages).
International Search Report dated Jun. 26, 2019 for corresponding International Application No. PCT/US2019/024125 (6 pages).

* cited by examiner

*Primary Examiner* — Charles Reid, Jr.
(74) *Attorney, Agent, or Firm* — Michael Best & Friedrich LLP

(57) ABSTRACT

A movable electrical generation system includes a generator operable to produce a supply of electrical energy, a prime mover operable to drive the generator, a first fuel, a second fuel different from the first fuel, a control system operable to deliver one of the first fuel and the second fuel to the prime mover and to control an electrical load applied to the generator based on one of a first fuel current protection limit and a second fuel current protection limit.

20 Claims, 2 Drawing Sheets

ADAPTIVE PROTECTION FOR A MULTI-FUEL GENERATOR SYSTEM

FIELD

The present disclosure relates to a generator system. More specifically, the disclosure relates to a mobile generator system fueled by multiple, different fuel sources, and an associated electrical load control system that limits the electrical load applied to the generator in response to the selected fuel source.

BACKGROUND

A mobile generator is generally known in the art. The mobile generator is a portable device configured to produce electricity. The mobile generator is often powered by an engine. In some mobile generators, the engine can be configured to operate using multiple, different fuel sources. However, different fuel sources can cause certain limitations on the generator. For example, different fuels can cause the generator to have different acceptable power ratings. One fuel source can have a 30% allowable power de-rate or more as compared to another fuel source, which can have no power de-rate. If the mobile generator does not properly account for the acceptable power ratings when switching between fuel sources, permanent damage can occur to one or more components of the mobile generator. As a non-limiting example, engine damage can occur if the mobile generator fails to properly de-rate the power rating after switching the fuel source, allowing for power delivery beyond the acceptable power rating range.

SUMMARY

In one embodiment, the disclosure provides a movable electrical generation system that includes a generator operable to produce a supply of electrical energy, a prime mover operable to drive the generator, a first fuel, a second fuel different from the first fuel, a control system operable to deliver one of the first fuel and the second fuel to the prime mover, the control system further configured to control an electrical load applied to the generator based on one of a first fuel current protection limit and a second fuel current protection limit. In response to the delivery of the first fuel to the prime mover, the control system implements the first fuel current protection limit and controls the electrical load applied to the generator based on the first fuel current protection limit. In response to the delivery of the second fuel to the prime mover, the control system implements the second fuel current protection limit and controls the electrical load applied to the generator based on the second fuel current protection limit.

In another embodiment, the disclosure provides a method of controlling an electrical load on a movable electrical generation system configured to operate on one of a plurality of different fuel sources. The method includes providing one of a first fuel and a second fuel to a prime mover as a selected fuel, the first fuel being different than the second fuel, and communicating the selected fuel to a controller, the controller operably connected to a generator, the generator driven by the prime mover. In response to the selected fuel being the first fuel, implementing a first fuel current protection limit, and controlling the electrical load applied to the generator based on the first fuel current protection limit. In response to the selected fuel being the second fuel, implementing a second fuel current protection limit, and controlling the electrical load applied to the generator based on the second fuel current protection limit.

Other aspects of the invention will become apparent by consideration of the detailed description and accompanying drawings.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

DETAILED DESCRIPTION

Figure 1:
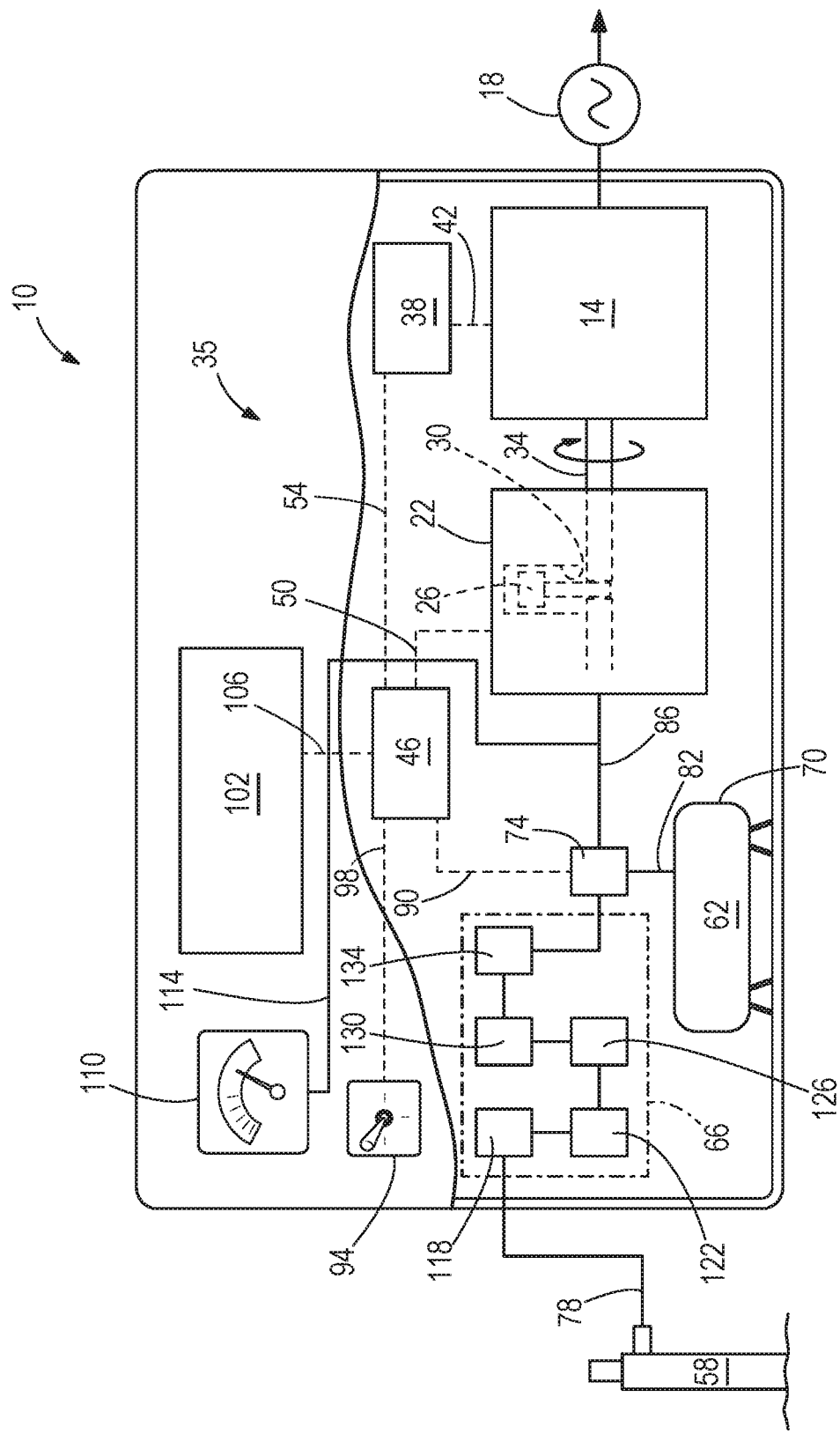
FIG. 1 is a schematic view of an embodiment of a multi-fuel mobile generator system.

FIG. 1 illustrates a schematic view of an embodiment of a multi-fuel mobile generator system 10 (or mobile electrical generation system 10). The system 10 is configured to be movable to a desired (or targeted) location for the generation of electricity (or electrical power). The system 10 is also configured to be operated by a plurality of different fuels (or fuel sources or multiple fuels).

The system 10 includes a generator 14. The generator 14 is operable to output electrical power 18. The electrical power 18 can be a single phase or three phase alternating current (AC) electrical power at a desired voltage and frequency. The generator 14 can also include one or more transformers (not shown) to facilitate an output of current at multiple desired voltages. In another example of embodiments, the generator 14 is configured to provide electrical power 18 as a direct current (DC) power supply at a desired voltage.

A prime mover 22 is operably connected to the generator 14. The prime mover 22 is an engine 22, and more specifically a reciprocating piston engine (e.g., an internal combustion, compression-ignition engine, etc.). As such, the engine 22 can include at least one piston 26 positioned in an associated cylinder 30. The at least one piston 26 (or a plurality of pistons 26) is configured to reciprocate in the associated cylinder 30 to rotate a drive shaft 34. The drive shaft 34 is coupled to the generator 14, and rotation of the drive shaft 34 drives the generator 14 to produce electrical power 18. While the illustrated embodiment depicts the prime mover 22 as a reciprocating piston internal combustion engine, in other embodiments, the prime mover 22 can be any engine suitable to drive the generator 14.

A control system 35, in one embodiment, includes a generator controller 38 that is operably connected to the generator 14 by a first communication link 42 and an engine controller 46 that is operably connected to the engine 22 by a second communication link 50. The engine controller 46 is also in communication with the generator controller 38 by a third communication link 54. Each communication link 42, 50, 54 can be wired link, a wireless link, a communication bus, or any other suitable communication device for the transfer of data, commands, and/or other information between components. It should also be appreciated that the combination of the generator 14 and the engine 22, and the associated components, can be referred to as a generator set (or genset). In other examples of embodiments of the system 10, the generator controller 38 and the engine controller 46 of control system 35 can be incorporated into a single controller that includes the functionality of each separate controllers 38, 46 as described herein.

The engine 22 is configured to operate using a plurality of different fuels. More specifically, the engine 22 is configured to operate using a first fuel 58 and a second fuel 62. While the illustrated embodiment illustrates two different fuel sources 58, 62, in other embodiments the engine 22 is configured to operate using three or more different fuels (or fuel sources).

With continued reference to FIG. 1, the first fuel 58 (or first fuel supply 58) is natural gas, and more specifically wellhead natural gas. Wellhead natural gas is generally supplied at an unregulated pressure, is unfiltered, is potentially wet, and can be referred to as raw wellhead natural gas (or unclean natural gas). Due to this unclean state, the wellhead natural gas must be treated by a scrubbing system 66 to prepare the natural gas 58 for combustion in the engine 22. Due to these features of wellhead natural gas, it cannot be used in the same manner as pipeline natural gas. More specifically, wellhead natural gas 58 is first treated (or cleaned) by a scrubbing system 66 to prepare the natural gas 58 for combustion in the engine 22. In other embodiments, the first fuel 58 can be pipeline natural gas, which is generally already treated or cleaned and in condition for combustion in the engine 22. Accordingly, in embodiments of the system 10 using pipeline natural gas as the first fuel 58, treatment by the scrubbing system 66 can be optional. While natural gas is one example of the first fuel 58, in other embodiments, the first fuel 58 can include propane, liquid propane, gasoline, diesel, kerosene, or any other suitable fuel.

The second fuel 62 (or second fuel supply 62) is liquid propane. The second fuel 62 can be stored in a storage tank 70, which can be positioned on-board the system 10, or external to the system 10. In other embodiments, the second fuel 62 can include natural gas, gasoline, diesel, kerosene, or any other suitable fuel that is different from the first fuel 58.

The first fuel 58 is fluidly connected to a fuel selector valve 74 by a first fuel supply line 78. The scrubbing system 66 can be positioned in the first fuel supply line 78 downstream of the first fuel supply 58 (e.g., the wellhead, etc.) and upstream of the fuel selector valve 74. The second fuel 62 is fluidly connected to the fuel selector valve 74 by a second fuel supply line 82. The fuel selector valve 74 is fluidly connected to the engine 22 by a fuel line 86. The fuel selector valve 74 can be a solenoid operated valve that is movable to at least a first position and a second position. In the first position, the valve 74 allows flow of the first fuel 58 from the first fuel source to the engine 22 through the fuel line 86, and inhibits flow of the second fuel 62 from the second fuel source through the fuel line 86. In the second position, the valve 74 allows from of the second fuel 62 from the second fuel source to the engine 22 through the fuel line 86, and inhibits flow of the first fuel 58 from the first fuel source through the fuel line 86. While the illustrated fuel selector valve 74 is a solenoid valve, in examples of other embodiments, the fuel selector valve 74 can be any suitable valve for selecting and/or inhibiting flow of at least the first and second fuels 58, 62.

The fuel selector valve 74 is in communication with the engine controller 46 by a fourth communication link 90. The fourth communication link 90 can be substantially the same as the first, second, and third communication links 42, 50, 54. The engine controller 46 is configured to automatically select the appropriate fuel source 58, 62 to fuel operation of the engine 22. In the illustrated embodiment, the first fuel 58 is monitored and delivered to the engine 22 at a first operating pressure range, while the second fuel 62 is monitored and delivered to the engine 22 at a second operating pressure range. The operating pressure ranges are selected and controlled such that they do not overlap, but fall within a pressure that is suitable for use by the engine 22. Thus, the first operating pressure range is separate and different than the second operating pressure range. In the illustrated example, the first fuel 58 (e.g., natural gas) operating pressure range is between approximately 8.0 and 11.5 inches of water, while the second fuel 62 (e.g., propane) operating pressure range is between approximately 11.5 and 14.0 inches of water. In other embodiments, the actual operating pressure ranges for the fuels can differ based on the fuel source.

The engine controller 46 is configured to receive a signal indicative of a measured first fuel pressure and a measured second fuel pressure, which is respectively measured upstream of the fuel selector valve 74. The engine controller 46 can use these measured pressure values to determine the position of the fuel selector valve 74. For example, if both measured pressures are within their desired operating pressure ranges, the engine controller 46 can select either fuel source 58, 62. Generally, the engine controller 46 will have a preprogrammed default fuel source. In the illustrated embodiment, the first fuel 58 (e.g., natural gas, etc.) is the default fuel. As such, the engine controller 46 selects the default fuel for use, and moves the fuel selector valve 74 to the first position. However, if one measured pressure is outside of its operating pressure range (e.g., the first fuel 58 or the second fuel 62), the engine controller 46 can automatically select the other fuel 62, 58 that is in its operating pressure range. For example, if the pressure value of the selected fuel 58, 62 is outside of its operating pressure range, the engine controller 46 can automatically select the other fuel 62, 58 that is in its operating pressure range. As such, the engine controller 46 actuates the fuel selector valve 74 to the suitable positon (e.g., the first position, the second position, etc.) to supply the desired fuel that is within its operating pressure range.

The engine controller 46 can also include a manual override of the automatic fuel selection. A fuel selector switch 94 is operably connected to the engine controller 46 by a fifth communication link 98. The fifth communication link 98 can be substantially the same as the first, second, third, and fourth communication links 42, 50, 54, 90. The fuel selector switch 94 allows a user to override the automatic fuel selection decision by the engine controller 46. In the illustrated embodiment, the fuel selector switch 94 is a three-position toggle switch. In a first position, the fuel selector switch 94 sends a signal to the engine controller 46 by the fifth communication link 98 that overrides the automatic fuel selection decision and forces the use of the first fuel 58. In a second position, the fuel selector switch 94 sends a signal to the engine controller 46 by the fifth communication link 98 that overrides the automatic fuel selection decision and forces the use of the second fuel 62. In a third position, the fuel selector switch 94 sends a signal to the engine controller 46 by the fifth communication link 98 that allows the engine controller 46 to make the automatic fuel selection decision based on the measured pressure of the respective fuel source 58, 62 in view of the associated operating pressure range. The engine controller 46 generally identifies and/or stores the selected fuel 58, 62 for delivery to the engine 22 (e.g., either by the automatic selection based on pressure or the manual override) as a current fuel source.

The engine controller 46 is also in operable communication with a user interface system 102 by a sixth communication link 106. The sixth communication link 106 can be substantially the same as the first, second, third, fourth, and fifth communication links 42, 50, 54, 90, 98. The user interface system 102 can include a control panel that allows a user to input commands, and monitor output signals. For example, an input command can include, but is not limited to, a system start signal, a system stop signal, and/or a voltage setting for the generator 14. An output signal can include, but is not limited to, a voltage indication, a frequency indication, system and/or equipment temperatures, operating speed, and/or warning indicators.

A fuel indicator 110 can identify to a user the selected fuel 58, 62 being supplied to the engine 22. The fuel indicator 110 is fluidly connected to the fuel line 86 by a pressure line 114. The fuel indicator 110 can be a mechanical pressure gauge (e.g., a Bourdon pressure gauge, etc.) that measures the pressure of the selected fuel 58, 62. An example of a suitable fuel indicator 110 is disclosed in pending U.S. patent application Ser. No. 14/679,570, the contents of which is hereby incorporated by reference in its entirety.

In operation, the system 10 is powered into an operating state. The engine controller 46 then selects the suitable fuel source (either through automatic, pressure based selection, or manual override selection) and responsively actuates the fuel selector valve 74. When the fuel selector valve 74 is actuated into the first position, the first fuel 58 is supplied to the engine 22, and the second fuel 62 is inhibited from flowing to the engine 22. More specifically, the first fuel 58, here unregulated raw wellhead natural gas 58, travels from the wellhead through the first fuel supply line 78, and enters the scrubbing system 66. In the scrubbing system 66, the wellhead natural gas can encounter a primary pressure regulator 118, a coalescer 122, a dryer 126, a particulate filter 130, and a secondary pressure regulator 134. The primary pressure regulator 118 receives the incoming unregulated wellhead natural gas and regulates the pressure to a desired level. For example, the pressure can be higher than the desired operating pressure range of the first fuel 58 delivered to the engine 22 to account for pressure drops through the remaining components of the scrubbing system 66.

The regulated wellhead natural gas 58 next enters the coalescer 122. The coalescer 122 is preferably a mechanical device that may include one or more of a filter, baffle, flow diverter, flow direction changing device, and/or velocity changing device to aid in the coalescing process. The coalescer 122 operates to separate liquids such as water or hydrocarbon condensate from the wellhead natural gas 58. In addition, the coalescer 122 may remove some particulate matter (e.g., dust, dirt, etc.) that may also be entrained in the flow of the wellhead natural gas 58.

The flow of wellhead natural gas 58 exits the coalescer 122 and enters the dryer 126. One of more adsorbent desiccant dryers 126 can be used to remove additional water from the flow of wellhead natural gas 58 to reduce the risk of condensation within the system 10. In various embodiments, a regenerating dryer 126 can be used to allow the desiccant to regenerate and increase the time the desiccant can be used before replacement is necessary. In other examples of embodiments, the dryer 126 can include a cyclonic dryer, a coalescing dryer, or any other dryer suitable for removing water from the wellhead natural gas 58.

After exiting the dryer 126, the dried wellhead natural gas 58 enters the particulate filter 130. The particulate filter 130 can include a filter element that is selected to filter the wellhead natural gas 58 to a desired level of cleanliness. Stated another way, the filter element can be selected to allow only particulates below a certain size to pass, with larger particles being captured by the filter element. The filtered natural gas 58 then flows to the secondary pressure regulator 134, which can regulate the pressure of the natural gas 58 to a level within the desired operating pressure range. The natural gas 58 then travels from the secondary pressure regulator 134 through the fuel selector valve 74, and to the engine 22 through the fuel line 86.

When the fuel selector valve 74 is actuated into the second position, the second fuel 62 is supplied to the engine 22, and the first fuel 58 is inhibited from flowing to the engine 22. More specifically, the second fuel 62, here liquid propane 62, travels from the storage tank 70, through the second fuel supply line 82, and to the fuel selector valve 74. The liquid propane 62 then travels through the fuel selector valve 74, and to the engine 22 through the fuel line 86.

In response to the selected fuel source 58, 62 being supplied to the engine 22, the engine controller 46 communicates with the generator controller 38 to implement a corresponding fuel based current protection limit (or fuel based load based protection limit). The current protection limit is configured to limit the overall electrical load that can be applied to the generator 14. Each current protection limit is customized to the selected fuel source to address the different, acceptable power ratings of the engine 22 based on the fuel source. As a non-limiting example, natural gas (as the first fuel 58) has a current protection limit that is greater than liquid propane (as the second fuel 62). This is due to the generator 14 experiencing an approximate 30% power de-rate when the motor 22 operates on liquid propane instead of natural gas. To address the different power ratings based on the fuel source 58, 62, each fuel source has an associated fuel based current protection limit. More specifically, a first fuel based current protection limit is associated with the first fuel 58, and stored in the generator controller 38. A second fuel based current protection limit is associated with the second fuel 62, and stored in the generator controller 38. The first fuel based current protection limit is different than the second fuel based current protection limit. In embodiments having three or more different fuel sources, each fuel can include an associated fuel based current protection limit. For example, in embodiments of the system 10 operating on N number of different fuel sources, the system 10 can include N number of associated fuel based current protection limits. It should be appreciated that each current protection limit can be customized to an associated fuel source, and thus can implement any suitable power de-rate (e.g., a current draw limit, a power draw limit, etc.) based on the fuel source.

Figure 2:
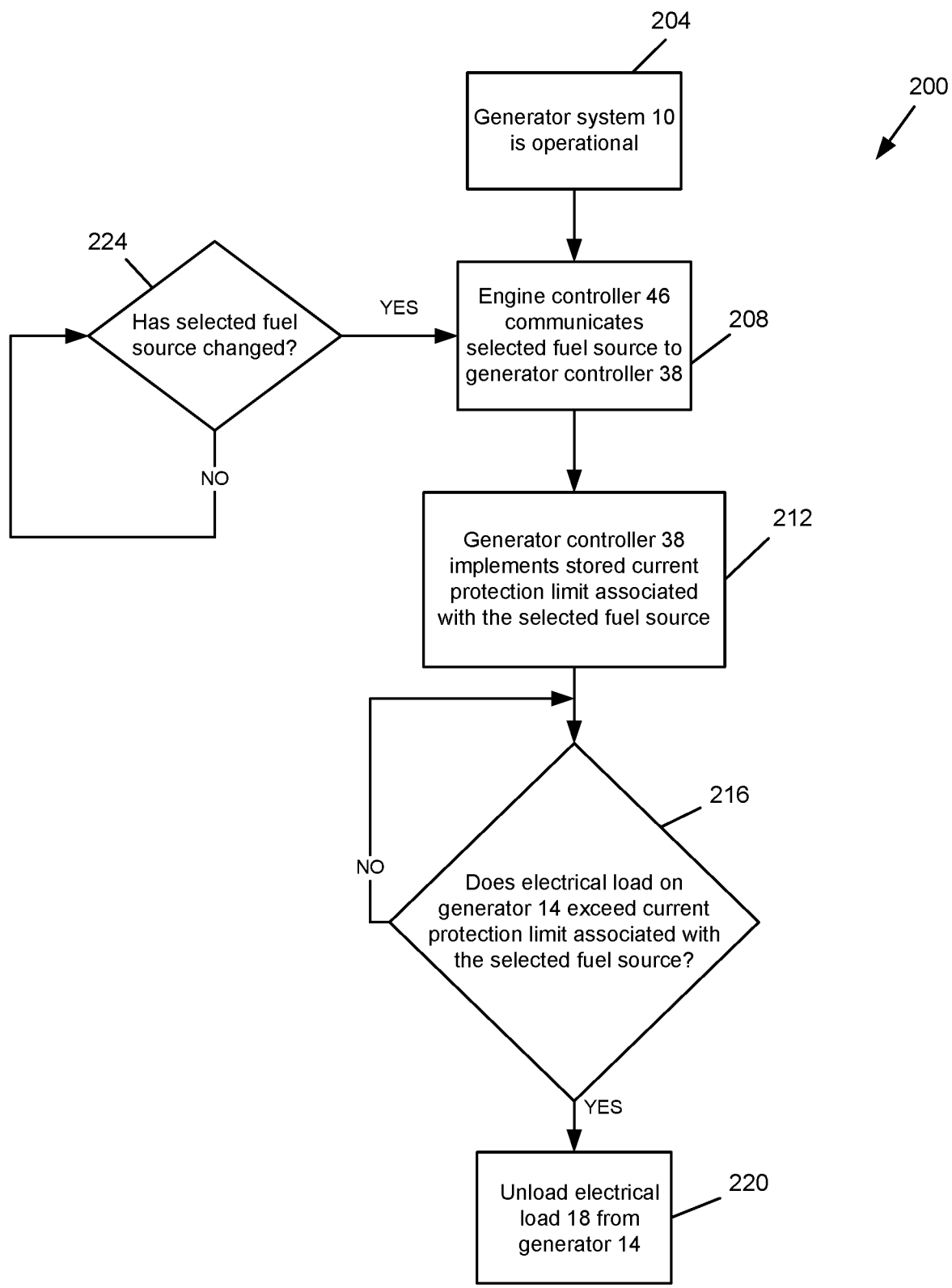
FIG. 2 is a flow diagram of a system for implementing a fuel based current protection limit on the generator.

FIG. 2 illustrates a fuel based current protection limit implementation system 200 for the generator 14 is illustrated. The system 200 includes a series of processing instructions or steps that are depicted in flow diagram form.

Referring now to FIG. 2, the system 200 begins at step 204, where the generator system 10 is operational. For example, the engine 22 is operating and driving the generator 14 to produce electrical power. The engine 22 receives one of the plurality of fuel sources 58, 62 to operate the engine 22. The engine controller 46 also recognizes (or identifies) the selected fuel source 58, 62 from the plurality of fuel sources 58, 62. For example, the engine controller 46 can identify the selected fuel source 58, 62 from one or more of detecting the position of the fuel selector valve 74 (e.g., in the first position, the second position, etc.), detecting the selected fuel from the automatic fuel selection process (e.g., pressure detection of fuel source, etc.), and/or detecting the selected fuel from the fuel selector switch 94 (e.g., the manual override of the automatic fuel selection, etc.). The identified selected fuel source 58, 62 can be locally stored (or logged or saved) by the engine controller 46.

Next at step 208, the engine controller 46 communicates the selected fuel source 58, 62 to the generator controller 38. For example, the engine controller 46 can transmit a signal (or data or information) indicative of the selected fuel source 58, 62 to the generator controller 38 through the third communication link 54. Once the selected fuel source 58, 62 is received by the generator controller 38, the process proceeds to step 212.

At step 212, the generator controller 38 implements a stored current protection limit that is associated with the selected fuel source 58, 62. The current protection limits can be stored locally at the generator controller 38, and implements in response to the selected fuel source 58, 62. As a non-limiting example, in response to the generator controller 38 receiving a communication indicating the first fuel source 58 is the selected fuel, the generator controller 38 implements the first fuel based current protection limit (i.e., the current protection limit associated with the first fuel source 58). As another example, in response to the generator controller 38 receiving a communication indicating the second fuel source 62 is the selected fuel, the generator controller 38 implements the second fuel based current protection limit (i.e., the current protection limit associated with the second fuel source 62). Once the current protection limit associated with the selected fuel source 58, 62 is implemented, the generator controller 38 can control the electrical load to the generator 14 based on the implemented limit (or power rating).

At step 216, the generator controller 38 controls the electrical load on the generator 14 based on the implemented fuel based current protection limit. More specifically, the generator controller 38 monitors the electrical load on the generator 14. The generator controller 38 then determines whether the electrical load on the generator 14 exceeds the current protection limit associated with the fuel source. As a non-limiting example, in an embodiment of the generator system 10 that uses natural gas as the first fuel source 58 and liquid propane as the second fuel source 62, when the engine 22 operates with natural gas as the selected fuel, the generator controller 38 implements the natural gas (or first) current protection limit. When the generator system 10 transitions to liquid propane as the second fuel source 62, and the engine 22 operates with natural gas as the selected fuel, the generator controller 38 implements the liquid propane (or second) current protection limit, which is approximately a 30% de-rate from the natural gas (or first) current protection limit. If the generator controller 38 determines that the electrical load on the generator 14 does not exceed the current protection limit associated with the selected fuel source, or determines "no," the process returns to step 216 and the controlling step continues (or repeats). If the generator controller 38 determines that the electrical load on the generator 14 does exceed the current protection limit associated with the selected fuel source, or determines "yes," the process proceeds to step 220.

At step 220, in response to the electrical load on the generator 14 exceeding the fuel based current protection limit, the generator controller 38 unloads the generator 14 from the engine 22 (or electrically unloads the generator 14 from the engine 22). For example, the generator controller 38 can facilitate opening of the electrical main breaker to unload the generator 14 from the engine 22. This protects the engine 22 from damage caused by power delivery by the generator 14 that exceeds (or is beyond) the acceptable range of the engine 22 when operating on the selected fuel source.

In addition, at step 224, the system 200 determines whether the selected fuel source has changed. Step 224 can occur separately and/or concurrently with steps 204 to 220. For example, step 224 can be a periodic query by the engine controller 46 to determine whether the selected fuel source changes. Additionally, or alternatively, step 224 can be initiated (or triggered) in response to a change in the fuel source after the generator system 10 is operational. For example, after initial operation, step 224 can be triggered by a change in the detected position of the fuel selector valve 74, a change in the selected fuel from the automatic fuel selection process, and/or a change in the selected fuel from the fuel selector switch 94. If the selected fuel source does not change, or "no" at step 224, the process returns to step 224 and the process continues (or repeats). If the selected fuel source does change, or "yes" at step 224, the process (e.g., the engine controller 46, etc.) identifies the change in the selected fuel source and then returns to step 208 to communicate the change in the selected fuel source to the generator controller 38. Steps 208 to 220 can then generally repeat as described above.

The multi-fuel generator system 10 and the associated fuel based current protection limit implementation system 200 advantageously automatically implement a current protection limit to control (or limit) the electrical load on the generator 14 that is based on the selected fuel source. Thus, the generator 14 is controlled to a different set of current protection limits based on the selected fuel source. This reduces the risk of damage to an engine 22 that operates on different fuel sources that have different power ratings (or maximum load limits). More specifically, by identifying the fuel source in use, and then implementing a current protection limit associated with the fuel source in use, the generator 14 can be unloaded from the engine 22 in response to a load that exceeds the fuel source based power rating of the engine 22.

Various additional features and advantages of the disclosure are set forth in the following claims.

What is claimed is:
1. A movable electrical generation system comprising:
   a generator operable to produce a supply of electrical energy;
   a prime mover operable to drive the generator;
   a first fuel;
   a second fuel different from the first fuel;
   a control system operable to deliver one of the first fuel and the second fuel to the prime mover and to control an electrical load applied to the generator based on one of a first current protection limit associated with the first fuel and a second current protection limit associated with the second fuel,
   wherein in response to the delivery of the first fuel to the prime mover, the control system implements the first current protection limit and controls the electrical load applied to the generator based on the first current protection limit to avoid exceeding a power rating limit of the prime mover, and
   wherein in response to the delivery of the second fuel to the prime mover, the control system implements the second current protection limit and controls the electrical load applied to the generator based on the second current protection limit to avoid exceeding a power rating limit of the prime mover.

2. The movable electrical generation system of claim 1, wherein the first current protection limit is different than the second current protection limit.

3. The movable electrical generation system of claim 1, wherein the second current protection limit has a reduced power rating than the first current protection limit.

4. The movable electrical generation system of claim 1, wherein the second current protection limit de-rates the load on the generator by at least 30% over the first current protection limit.

5. The movable electrical generation system of claim 1, wherein the prime mover is an engine.

6. The movable electrical generation system of claim 5, wherein the control system includes a first controller to control the engine and a second controller to control operation of and provide protection to the generator.

7. The movable electrical generation system of claim 6, wherein the first controller and the second controller are portions of a single controller.

8. The movable electrical generation system of claim 6, wherein the second controller monitors the electrical load on the generator.

9. The movable electrical generation system of claim 6, wherein the second controller controls the electrical load applied to the generator based on the first current protection limit by monitoring the electrical load on the generator, and in response to the monitored electrical load on the generator exceeding the first current protection limit, unloading the generator and the prime mover.

10. The movable electrical generation system of claim 6, wherein the second controller controls the electrical load applied to the generator based on the second current protection limit by monitoring the electrical load on the generator, and in response to the monitored electrical load on the generator exceeding the second current protection limit, unloading the generator and the prime mover.

11. The movable electrical generation system of claim 1, wherein the first fuel is raw wellhead natural gas.

12. The movable electrical generation system of claim 1, wherein the first fuel is natural gas.

13. The movable electrical generation system of claim 12, wherein the second fuel is liquid propane.

14. The movable electrical generation system of claim 1, further comprising a fuel selector valve arranged to receive the first fuel and the second fuel, and to deliver one of the first fuel and the second fuel to the prime mover.

15. The movable electrical generation system of claim 14, wherein the control system is in operable communication with the fuel selector valve and is configured to actuate the fuel selector valve to deliver one of the first fuel and the second fuel to the prime mover.

16. The movable electrical generation system of claim 15, wherein the first fuel is at a first pressure and the second fuel is at a second pressure, the first controller is operable to automatically configure the fuel selector valve to deliver one of the first fuel and the second fuel to the prime mover based on the first pressure and the second pressure.

17. A method of controlling an electrical load on a movable electrical generation system configured to operate on one of a plurality of different fuel sources comprising:
providing one of a first fuel and a second fuel to a prime mover as a selected fuel, the first fuel being different than the second fuel; and
communicating the selected fuel to a controller, the controller operably connected to a generator, the generator driven by the prime mover;
wherein in response to the selected fuel being the first fuel, implementing a first current protection limit associated with the first fuel, and controlling the electrical load applied to the generator based on the first current protection limit to avoid exceeding a power rating limit of the prime mover, and
wherein in response to the selected fuel being the second fuel, implementing a second current protection limit associated with the second fuel, and controlling the electrical load applied to the generator based on the second current protection limit to avoid exceeding a power rating limit of the prime mover.

18. The method of claim 17, wherein in response to the first fuel being the selected fuel, further comprising:
detecting the electrical load applied to the generator by the controller; and
in response to the electrical load applied to the generator exceeding the first current protection limit, electrically unloading the generator from the prime mover.

19. The method of claim 17, wherein in response to the second fuel being the selected fuel, further comprising:
detecting the electrical load applied to the generator by the controller; and
in response to the electrical load applied to the generator exceeding the second current protection limit, electrically unloading the generator from the prime mover.

20. The method of claim 17, wherein in response to a change in the selected fuel, communicating the change in the selected fuel to the controller,
wherein in response to the change in the selected fuel being from the second fuel to the first fuel, implementing the first current protection limit, and controlling the electrical load applied to the generator based on the first current protection limit, and
wherein in response to the change in the selected fuel being from the first fuel to the second fuel, implementing the second current protection limit, and controlling the electrical load applied to the generator based on the second current protection limit.

* * * * *